UNITED STATES PATENT OFFICE.

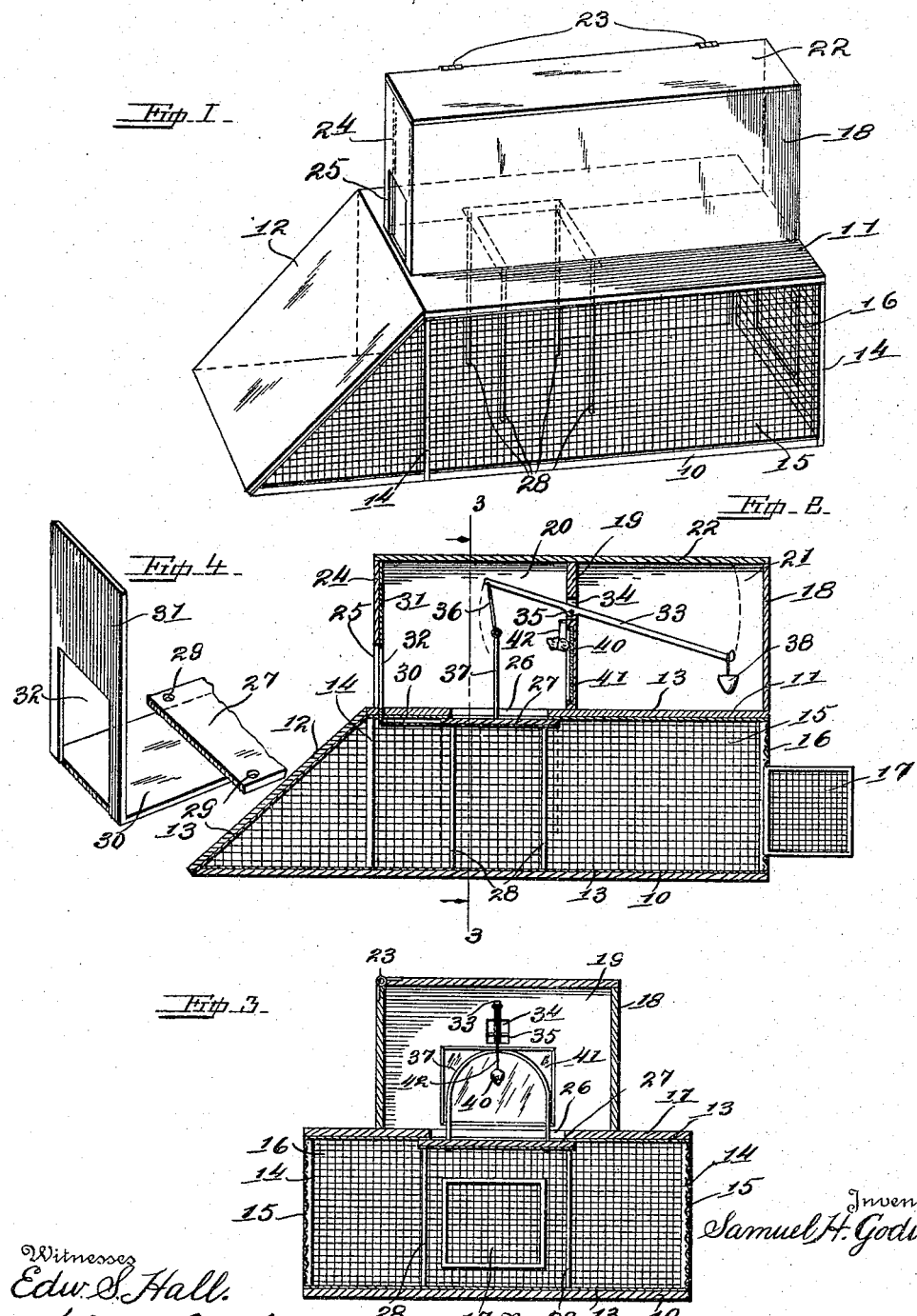

SAMUEL H. GODWIN, OF ELKINS, WEST VIRGINIA.

RAT-TRAP.

1,178,851. Specification of Letters Patent. Patented Apr. 11, 1916.

Application filed March 17, 1914. Serial No. 825,310.

*To all whom it may concern:*

Be it known that I, SAMUEL H. GODWIN, a citizen of the United States, residing at Elkins, in the county of Randolph and State of West Virginia, have invented certain new and useful Improvements in Rat-Traps, of which the following is a specification.

This invention relates to a trap which is used for catching such animals as rats, and the principal object of the invention is to provide a trap which will return to a set position after a rat has been caught, the platform which conveys the rat to the lower chamber of the trap forming a closure for the opening communicating with the lower chamber.

Another object of the invention is to provide the platform with an extension which forms a closure for the upper chamber and which closes the entrance thereto when the platform moves downwardly.

Another object of the invention is to so mount the platform that the rat must step upon the same before reaching the bait thus preventing the rat from eating the bait.

Another object of the invention is to provide improved means for forming the platform to move downwardly and to be then returned to its elevated position and after the rat has stepped off of the same.

Another object of the invention is to provide the upper compartment with a partition with which the platform control bar is pivotally connected, and to provide the partition with a mirror positioned to the rear of the bait.

Another object of the invention is to provide the trap with an improved frame construction so that the forward end portion of the lower compartment forms a gangway for permitting the rat to approach the entrance to the upper compartment.

This invention is illustrated in the accompanying drawings wherein—

Figure 1 is a perspective view of the improved trap; Fig. 2 is a longitudinal sectional view through the trap; Fig. 3 is a transverse sectional view through the trap taken along the line 3—3 of Fig. 2; Fig. 4 is a fragmentary perspective view showing a portion of the platform and the closure for the entrance to the upper chamber.

The flooring 10, top 11, and end wall 12 of the lower chamber are formed of wood or some other similar material and are provided with metallic linings 13 which are provided so that a rat confined in the lower chamber can not gnaw its way out. Supporting standards 14 are provided to support the top 11 and to also provide means for bracing the lower compartment. The side walls 15 and end wall 16 are formed of strips of wire mesh which is secured by any suitable fasteners desired. A door 17 is provided in the rear wall 16 so that the animals in the lower chamber can be removed when desired.

The upper chamber 18 is carried by the top 11 of the lower chamber and from an inspection of Fig. 2 it will be readily seen that the top 11 forms a flooring for the upper chamber. This upper chamber is provided with a partition 19 which divides the upper chamber into the two compartments 20 and 21. The top 22 of the upper chamber is hinged to one of the side walls of the upper chamber by means of the hinges 23 so that the top may be raised and access thus had to the upper chamber. A forward end wall 24 of the upper chamber is provided with an entrance opening or doorway 25 so that the rat may enter the compartment 20. In the top 11 which forms the flooring for the upper chamber there is provided an opening 26 which is formed within the compartment 20 and adjacent the partition 19 so that the rat may pass through the flooring 11 and into the lower compartment.

In order to slidably mount the platform 27 there has been provided guiding rods 28 which are mounted vertically in the lower chamber and passed through openings 29 formed in corners of the platform 27. These rods 28 not only form guiding means for the platform 27 but also form means for supporting the roof 11 thus preventing the roof from being weakened by having the opening cut therein. This platform 27 is of such size that it will extend beyond the opening 26 as shown in Figs. 2 and 3 and thus cause the opening to be closed when the platform is raised.

It should be noted that by having the platform 27 of greater diameter than the opening 26 the platform will form a stop to limit the movement of the lever 33 in one direction and thus prevent the danger of the platform being raised beyond a desired height and it should also be noted that due to this construction the platform when in a normal position is lower than the flooring 13 and therefore the animal must step down upon the platform. Therefore when the platform gives way the animal will fall forwardly and cannot jump back upon the flooring. It should be noted that by having the opening 26 nearer the partition 19 than the front wall 24 the animal will pass entirely into the housing 18 before reaching the platform and therefore it will not be frightened away by stepping upon an unsteady support when entering the doorway 25. A strip 30 is secured to the platform 27 by any suitable means and extends forwardly of the platform. The strip 30 which is preferably formed of sheet metal is bent upwardly to form a closure 31 which extends through a slot formed in the flooring 11 and is intended to close the door-way 25 when the platform is lowered. In the closure 31 there is formed an opening 32 which is of substantially the same size as the opening 25 so that when the platform is raised, the openings 25 and 32 will register and thus permit a rat to enter the compartment 20.

A lever or bar 33 extends through an opening 34 formed in the partition 19 and is pivotally mounted upon a pin 35 with its forward end positioned above the platform 27. In order to connect the platform with the forward end of the lever, there has been provided a link 36 which is pivotally connected at its upper end to the lever and has its end formed into an eye through which the bail or hanger 37 passes. This bail 37 has its two arms connected with the platform 27 and it will thus be seen that the platform and lever will move together. A small receptacle 38 which resembles a basket is placed upon the rear end of the lever 33 and is intended to hold weights such as shot or the like so that the movement of the platform can be controlled. By this means the operation of the trap may be regulated so that it will operate to catch either rats or mice.

The bait 40 which may be either cheese or any other suitable substance is suspended in front of a mirror 41 by any suitable means such as the thread 42. By having the bait placed in front of the mirror 41 the rat which approaches the door-way 25 will see the reflection in the mirror and thinking that another rat is approaching the bait will move quickly into the compartment 20 so as to reach the bait before the supposedly second rat. As the rat approaches the bait, it must pass over the platform 27; and since this platform is positioned beneath the opening 26, the rat will drop down upon the platform. When the rat alights upon the platform, the weight of the rat will cause the platform to move downwardly thus conveying the rat into the lower chamber and closing the door-way 25. As the door-way 25 closes, the light entering the compartment 20 will be cut off and since a rat will naturally seek the light when attempting to escape, it will jump off of the platform to the flooring of the lower chamber. The weight of the shot in the receptacle or basket 38 will then cause the forward end portion of the lever 33 to swing upwardly carrying with it the platform 27 and closes the opening 26. The rat will then be confined in the lower chamber and the door-way 25 will be opened thus leaving the trap set and ready for operation. It will therefore be evident that more than one rat can be caught since the trap is at all times in a set position excepting when conveying a rat into the lower chamber.

What is claimed is:

1. A trap comprising a lower chamber, an upper chamber, a partition between said upper and lower chambers having an opening formed therein to permit communication between said upper and lower chambers, supporting rods positioned in said lower chamber to support the partition adjacent the opening, a platform slidably mounted upon said rods, a pivotally mounted lever in said upper chamber connected with said platform, means for normally holding said lever in a position to retain said platform in a position to close the opening formed in the partition.

2. A trap comprising in combination a lower confining chamber provided with a light admitting wall, an upper chamber positioned above said lower chamber and provided with an inlet opening, a partition between said chambers forming a flooring for the upper chamber and provided with an opening permitting communication between said chambers, the opening being spaced from the inlet opening of said upper chamber, a platform slidably mounted in said lower chamber, means for yieldably holding said platform in a raised position to close the opening in said partition, and a closure for the inlet opening of said upper chamber operated from said platform and remaining in an open position when said platform is raised, the inlet opening of said upper chamber being closed as said platform moves downwardly to darken the upper chamber whereby an animal upon the lowering platform will be attracted into said lower chamber by the light entering the wall thereof.

In testimony whereof I affix my signature in presence of two witnesses.

SAMUEL H. GODWIN.

Witnesses:
 CHARLES L. CORDER,
 GEORGE G. GALL.